United States Patent
Hsueh et al.

(10) Patent No.: US 9,628,778 B2
(45) Date of Patent: Apr. 18, 2017

(54) CALIBRATION SYSTEM OF A STEREO CAMERA AND CALIBRATION METHOD OF A STEREO CAMERA

(71) Applicant: Etron Technology, Inc., Hsinchu (TW)

(72) Inventors: Le-Shan Hsueh, Taipei (TW); Yung-Wei Chen, Taipei (TW)

(73) Assignee: eYs3D Microelectronics, Co., Taipei (TW)

( * ) Notice: Subject to any disclaimer, the term of this patent is extended or adjusted under 35 U.S.C. 154(b) by 431 days.

(21) Appl. No.: 14/512,477

(22) Filed: Oct. 13, 2014

(65) Prior Publication Data
US 2015/0103143 A1   Apr. 16, 2015

Related U.S. Application Data

(60) Provisional application No. 61/890,330, filed on Oct. 14, 2013.

(30) Foreign Application Priority Data

Oct. 7, 2014 (TW) .............................. 103134918 A

(51) Int. Cl.
*H04N 13/02* (2006.01)
*G06T 7/80* (2017.01)

(52) U.S. Cl.
CPC .......... *H04N 13/0246* (2013.01); *G06T 7/85* (2017.01)

(58) Field of Classification Search
CPC .............................. H04N 13/0246; G06T 7/85
See application file for complete search history.

(56) References Cited

U.S. PATENT DOCUMENTS

| 7,023,473 B2 * | 4/2006 | Iwai | G01C 3/08 348/187 |
| 7,313,265 B2 * | 12/2007 | Nakai | G06T 7/85 382/104 |
| 7,479,982 B2 * | 1/2009 | Otani | G01C 11/06 348/175 |

(Continued)

FOREIGN PATENT DOCUMENTS

| CN | 201233503 Y | 5/2009 |
| CN | 101581569 A | 11/2009 |
| CN | 103324021 A | 9/2013 |

*Primary Examiner* — Jay Patel
*Assistant Examiner* — Irfan Habib
(74) *Attorney, Agent, or Firm* — Winston Hsu; Scott Margo

(57) ABSTRACT

A calibration method of a stereo camera includes optionally setting a plurality of camera calibration parameters and a plurality of image rectification parameters of the stereo camera; executing an image capture step on at least one left eye pattern and at least one right eye pattern corresponding to each two-dimensional image of at least one two-dimensional image; generating a plurality of new camera calibration parameters according to a plurality of first images corresponding to all left eye patterns corresponding to the at least one two-dimensional image and a plurality of second images corresponding to all right eye patterns corresponding to the at least one two-dimensional image; and generating a plurality of new image rectification parameters of the stereo camera according to the plurality of new camera calibration parameters.

17 Claims, 5 Drawing Sheets

(56) References Cited

U.S. PATENT DOCUMENTS

| | | | |
|---|---|---|---|
| 7,554,575 B2* | 6/2009 | Zandifar | G09G 3/2092 348/187 |
| 7,733,404 B2* | 6/2010 | Zandifar | G09G 3/2092 348/180 |
| 7,750,969 B2* | 7/2010 | Sato | G01B 11/2504 348/187 |
| 8,098,276 B2* | 1/2012 | Chang | H04N 13/0025 348/43 |
| 8,428,342 B2* | 4/2013 | Tian | G06T 5/005 345/419 |
| 8,564,641 B1* | 10/2013 | Levin | H04N 13/0246 345/420 |
| 8,717,421 B2* | 5/2014 | Peters, II | G06T 7/85 348/47 |
| 9,066,072 B2* | 6/2015 | Bai | H01L 27/14632 |
| 9,143,762 B2* | 9/2015 | Ogasahara | H04N 13/0022 |
| 9,258,546 B2* | 2/2016 | Ha | H04N 13/0239 |
| 9,282,326 B2* | 3/2016 | Olson | H04N 17/002 |
| 9,393,694 B2* | 7/2016 | Wallack | B25J 9/1692 |
| 9,424,645 B2* | 8/2016 | Oho | H04N 13/0246 |
| 2004/0189805 A1* | 9/2004 | Seitz | H04N 5/232 348/188 |
| 2005/0280709 A1* | 12/2005 | Katayama | G01C 11/02 348/187 |
| 2008/0012850 A1* | 1/2008 | Keating, III | H04N 13/0207 345/419 |
| 2009/0060280 A1* | 3/2009 | Choi | G06T 7/593 382/106 |
| 2010/0020178 A1* | 1/2010 | Kleihorst | G06T 7/85 348/175 |
| 2010/0328435 A1* | 12/2010 | Puah | G01B 11/0608 348/47 |
| 2012/0274627 A1* | 11/2012 | Huggett | G06T 7/85 345/419 |
| 2013/0182083 A1* | 7/2013 | Grossmann | H04N 13/0402 348/51 |
| 2014/0125772 A1* | 5/2014 | Myokan | H04N 13/0246 348/47 |
| 2015/0145965 A1* | 5/2015 | Livyatan | B60R 1/00 348/47 |
| 2016/0198145 A1* | 7/2016 | Lee | H04N 13/0246 348/47 |
| 2016/0316192 A1* | 10/2016 | Kishiwada | B32B 17/10036 |

* cited by examiner

CALIBRATION SYSTEM OF A STEREO CAMERA AND CALIBRATION METHOD OF A STEREO CAMERA

CROSS REFERENCE TO RELATED APPLICATIONS

This application claims the benefit of U.S. Provisional Application No. 61/890,330, filed on Oct. 14, 2013 and entitled "Stereo Camera Calibration," the contents of which are incorporated herein by reference.

BACKGROUND OF THE INVENTION

1. Field of the Invention

The present invention relates to a calibration system of a stereo camera and a calibration method of a stereo camera, and particularly to a calibration system of a stereo camera and a calibration method of a stereo camera that can utilize a host to quickly simulate to generate at least one left eye pattern and at least one right eye pattern corresponding to each two-dimensional pattern of at least one two-dimensional pattern to a display to reduce verification time of the stereo camera and simplify a verification environment of the stereo camera before the stereo camera is shipped.

2. Description of the Prior Art

A calibration method of a stereo camera provided by the prior art first utilizes manual control or a machine to rotate a predetermined two-dimensional pattern to different angles, and then utilizes a left eye image capture unit and a right eye pattern capture unit of the stereo camera to capture images corresponding to the predetermined two-dimensional pattern at the different angles, respectively. After the left eye image capture unit and the right eye pattern capture unit capture the images corresponding to the predetermined two-dimensional pattern at the different angles, respectively, the calibration method can generate camera calibration parameters and image rectification parameters of the stereo camera according to the images corresponding to the predetermined two-dimensional pattern at the different angles.

However, the calibration method is too complicated and costs too much time. Therefore, the calibration method of a stereo camera provided by the prior art is only suitable for laboratory operation, but not suitable for a verification environment set by a manufacturer of the stereo camera before the stereo camera is shipped.

SUMMARY OF THE INVENTION

An embodiment provides a calibration method of a stereo camera, wherein a calibration system applied to the calibration method includes a host and a display, and the stereo camera includes a left eye image capture unit and a right eye pattern capture unit. The calibration method includes the host optionally setting a plurality of camera calibration parameters and a plurality of image rectification parameters of the stereo camera; the left eye image capture unit and the right eye pattern capture unit executing an image capture step on at least one left eye pattern and at least one right eye pattern generated by the host corresponding to each two-dimensional pattern of at least one two-dimensional pattern, respectively, wherein the image capture step comprises: wherein the image capture step includes the display displaying the at least one left eye pattern, wherein each left eye pattern of the at least one left eye pattern corresponds to a predetermined angle and a predetermined distance; the left eye image capture unit capturing a first image corresponding to the each left eye pattern; the display displaying the at least one right eye pattern, wherein each right eye pattern of the at least one right eye pattern corresponds to the predetermined angle and the predetermined distance; and the right eye pattern capture unit capturing a second image corresponding to the each right eye pattern; the host generating a plurality of new camera calibration parameters according to a plurality of first images corresponding to all left eye patterns of the at least one two-dimensional pattern and a plurality of second images corresponding to all right eye patterns of the at least one two-dimensional pattern after the image capture step is executed on the at least one left eye pattern and the at least one right eye pattern corresponding to the each two-dimensional pattern; and; the host generating a plurality of new image rectification parameters according to the plurality of new camera calibration parameters.

Another embodiment provides a calibration system of a stereo camera, wherein the stereo camera includes a left eye image capture unit and a right eye pattern capture unit. The calibration system includes a host and a display. The host is used for optionally setting a plurality of camera calibration parameters and a plurality of image rectification parameters of the stereo camera, and generating at least one left eye pattern and at least one right eye pattern corresponding to each two-dimensional pattern of at least one two-dimensional pattern. The display is coupled to the host for displaying the at least one left eye pattern and the at least one right eye pattern, wherein each left eye pattern of the at least one left eye pattern and each right eye pattern of the at least one right eye pattern correspond to a predetermined angle and a predetermined distance. After the display displays the each left eye pattern, the left eye image capture unit captures a first image corresponding to the each left eye pattern, and after the display displays the each right eye pattern, the right eye pattern capture unit captures a second image corresponding to the each right eye pattern; wherein after the left eye image capture unit captures the first image corresponding to the each left eye pattern, and the right eye pattern capture unit captures the second image corresponding to the each right eye pattern, the host further generates a plurality of new camera calibration parameters according to a plurality of first images corresponding to all left eye patterns of the at least one two-dimensional pattern and a plurality of second images corresponding to all right eye patterns of the at least one two-dimensional pattern, and generates a plurality of new image rectification parameters according to the plurality of new camera calibration parameters.

Another embodiment provides a calibration system of a stereo camera, wherein the stereo camera comprises a left eye image capture unit and a right eye pattern capture unit. The calibration system includes a host and a display. The host is used for optionally setting a plurality of camera calibration parameters and a plurality of image rectification parameters of the stereo camera, and generating at least one left eye pattern and at least one right eye pattern corresponding to each two-dimensional pattern of at least one two-dimensional pattern. The display is coupled to the host for displaying the at least one left eye pattern and the at least one right eye pattern, and each left eye pattern of the at least one left eye pattern and each right eye pattern of the at least one right eye pattern corresponding to a predetermined angle and a predetermined distance, wherein the left eye image capture unit of the stereo camera generates a plurality of first images according to the at least one left eye pattern, and the right eye pattern capture unit of the stereo camera generates a plurality of second images according to the at least one right eye pattern. The host generates a plurality of new camera calibration parameters according to the plurality of first images and the plurality of second images, and generates a plurality of new image rectification parameters according to the plurality of new camera calibration parameters.

The present invention provides a calibration system of a stereo camera and a calibration method of a stereo camera. The calibration system and the calibration method utilize a host to quickly simulate to generate at least one left eye pattern and at least one right eye pattern corresponding to each two-dimensional pattern of at least one two-dimensional pattern to a display, wherein each left eye pattern of the at least one left eye pattern and a corresponding right eye pattern of the at least one right eye pattern correspond to a predetermined angle and a predetermined distance. Therefore, compared to the prior art, the present invention has advantages as follows: first, because the host can simulate to generate the at least one left eye pattern and the at least one right eye pattern corresponding to the each two-dimensional pattern of the at least one two-dimensional pattern to the display, the present invention does not need a robotic arm to control the at least one two-dimensional pattern to different predetermined angles and different predetermined distances to simplify a verification environment before the stereo camera is shipped; and second, because the host can quickly simulate to generate the at least one left eye pattern and the at least one right eye pattern corresponding to the each two-dimensional pattern of the at least one two-dimensional pattern to the display, the present invention can significantly reduce verification time before the stereo camera is shipped.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
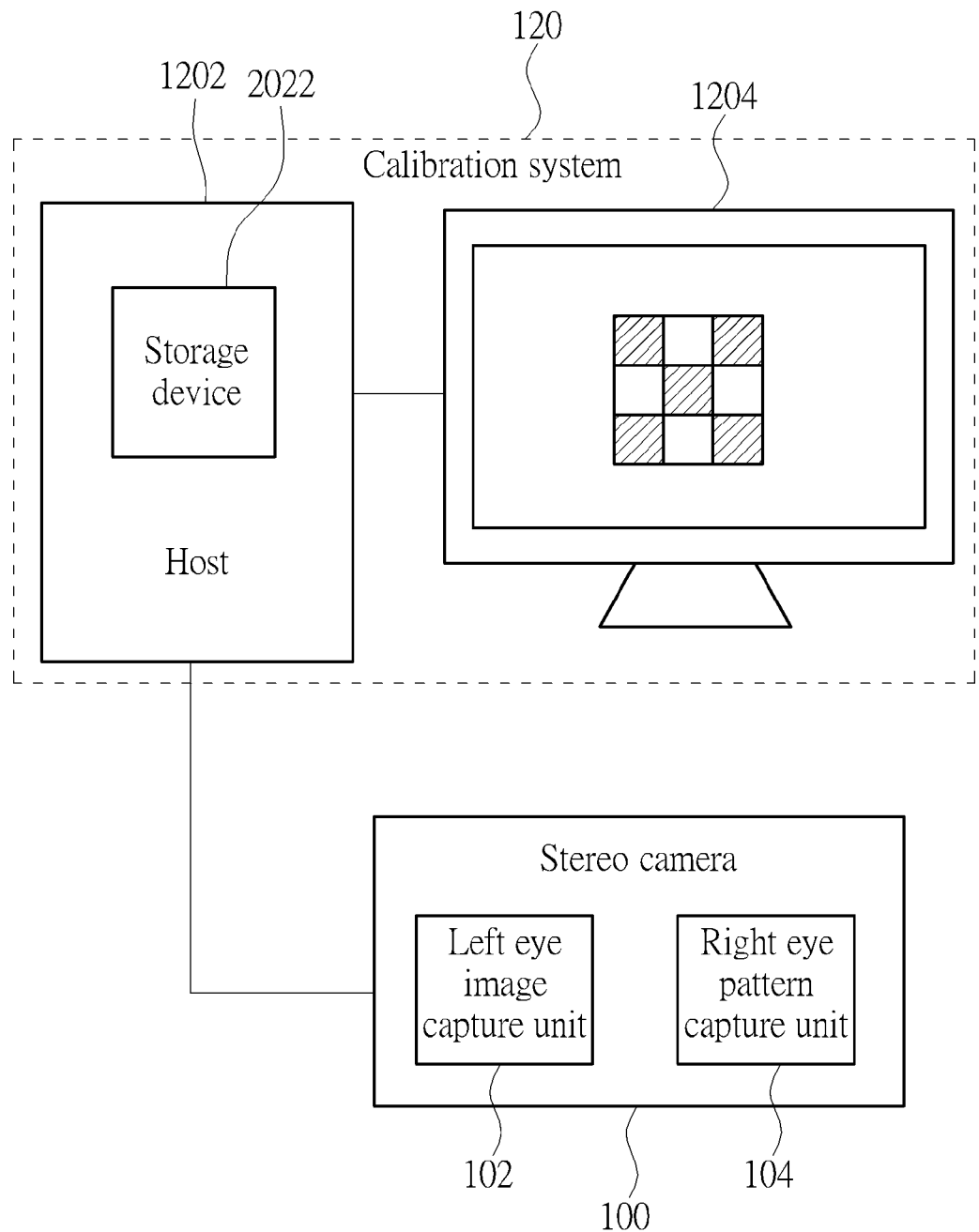
FIG. 1 is a diagram illustrating a calibration system of a stereo camera according to a first embodiment.
Figure 2:
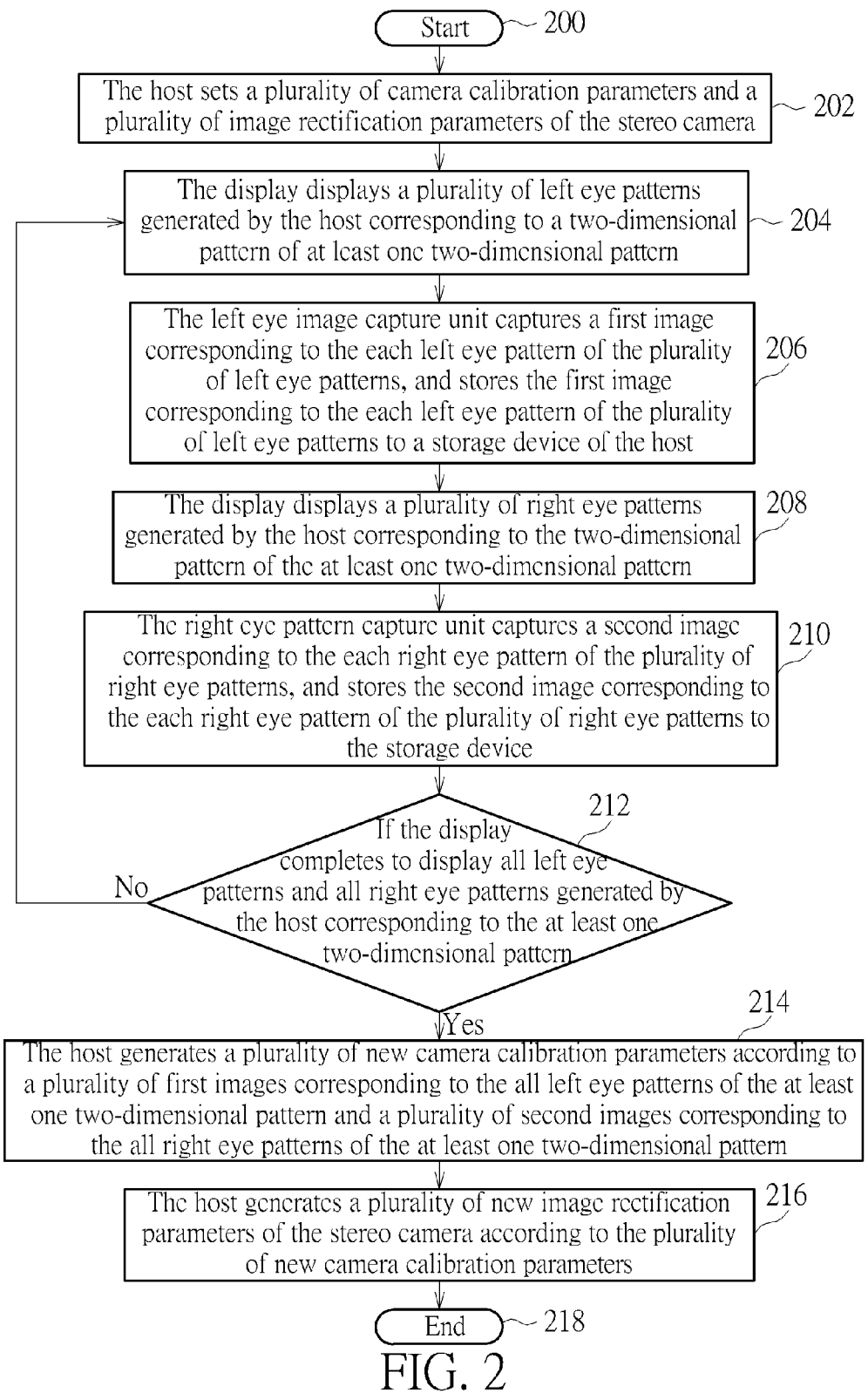
FIG. 2 is a flowchart illustrating a calibration method of a stereo camera according to a second embodiment.

Please refer to FIG. 1. FIG. 1 is a diagram illustrating a calibration system 120 of a stereo camera 100 according to a first embodiment, wherein the stereo camera 100 includes a left eye image capture unit 102 and a right eye pattern capture unit 104, and the calibration system 120 includes a host 1202 and a display 1204. Please refer to FIGS. 1, 2. FIG. 2 is a flowchart illustrating a calibration method of a stereo camera according to a second embodiment. The method in FIG. 2 is illustrated using the stereo camera 100 and the calibration system 120 in FIG. 1. Detailed steps are as follows:

Step 200: Start.

Step 202: The host 1202 sets a plurality of camera calibration parameters and a plurality of image rectification parameters of the stereo camera 100.

Step 204: The display 1204 displays a plurality of left eye patterns generated by the host 1202 corresponding to a two-dimensional pattern of at least one two-dimensional pattern, wherein each left eye pattern of the plurality of left eye patterns corresponds to a predetermined angle and a predetermined distance.

Step 206: The left eye image capture unit 102 captures a first image corresponding to the each left eye pattern of the plurality of left eye patterns, and stores the first image corresponding to the each left eye pattern of the plurality of left eye patterns to a storage device 2022 of the host 1202.

Step 208: The display 1204 displays a plurality of right eye patterns generated by the host 1202 corresponding to the two-dimensional pattern of the at least one two-dimensional pattern, wherein each right eye pattern of the plurality of right eye patterns corresponds to the predetermined angle and the predetermined distance.

Step 210: The right eye pattern capture unit 104 captures a second image corresponding to the each right eye pattern of the plurality of right eye patterns, and stores the second image corresponding to the each right eye pattern of the plurality of right eye patterns to the storage device 2022.

Step 212: If the display 1204 completes to display all left eye patterns and all right eye patterns generated by the host 1202 corresponding to the at least one two-dimensional pattern; if no, go to Step 204; if yes, go to Step 214.

Step 214: The host 1202 generates a plurality of new camera calibration parameters according to a plurality of first images corresponding to the all left eye patterns of the at least one two-dimensional pattern and a plurality of second images corresponding to the all right eye patterns of the at least one two-dimensional pattern.

Step 216: The host 1202 generates a plurality of new image rectification parameters of the stereo camera 100 according to the plurality of new camera calibration parameters.

Step 218: End.

Figure 3:
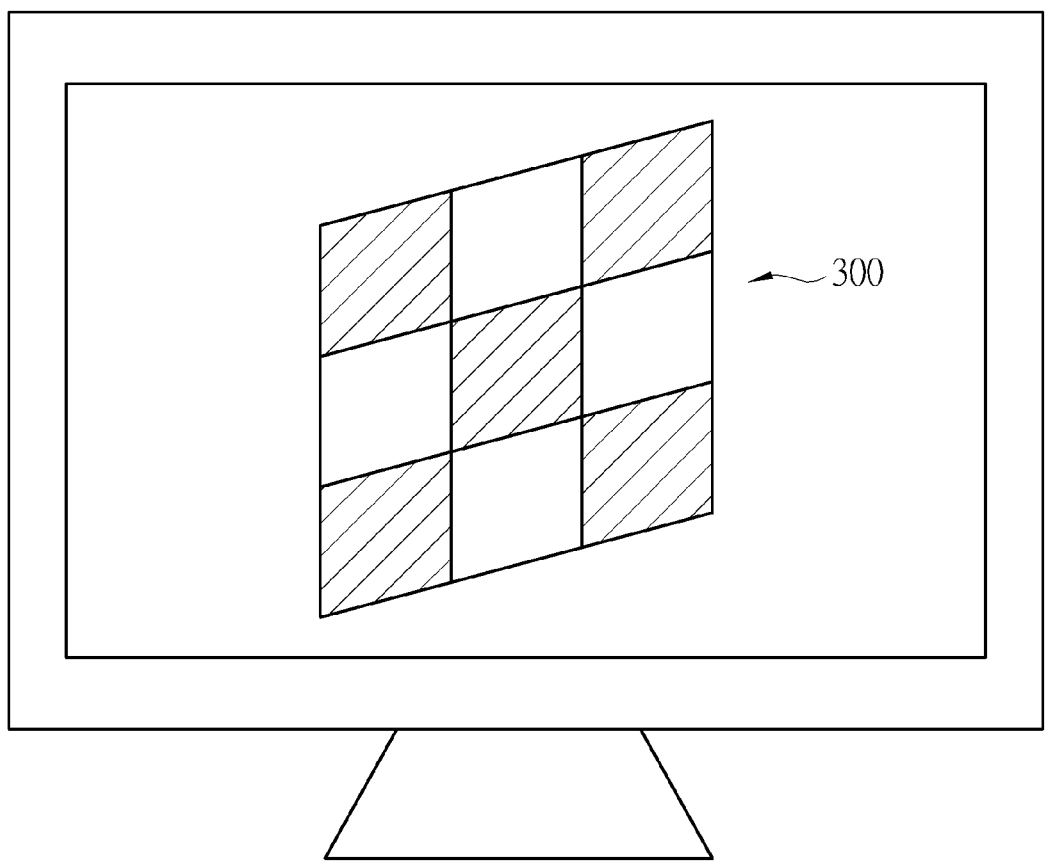
FIGS. 3-5 are diagrams illustrating left eye patterns corresponding to different predetermined angles and different predetermined distances.
Figure 4:
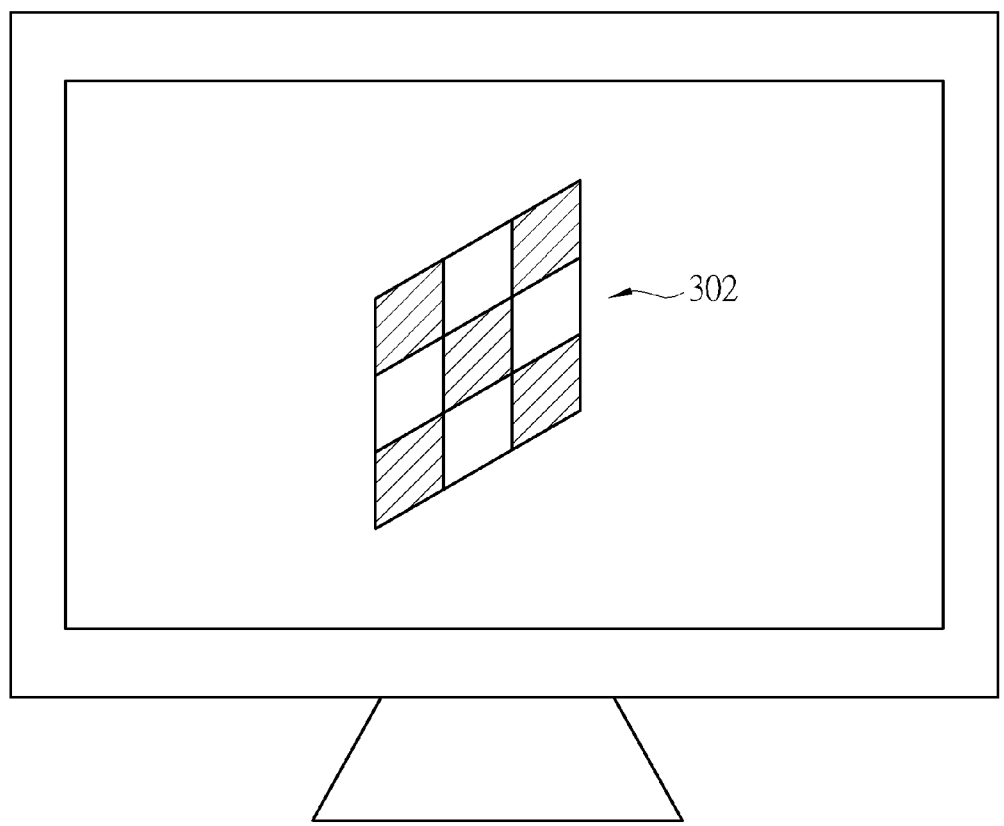
Figure 5:
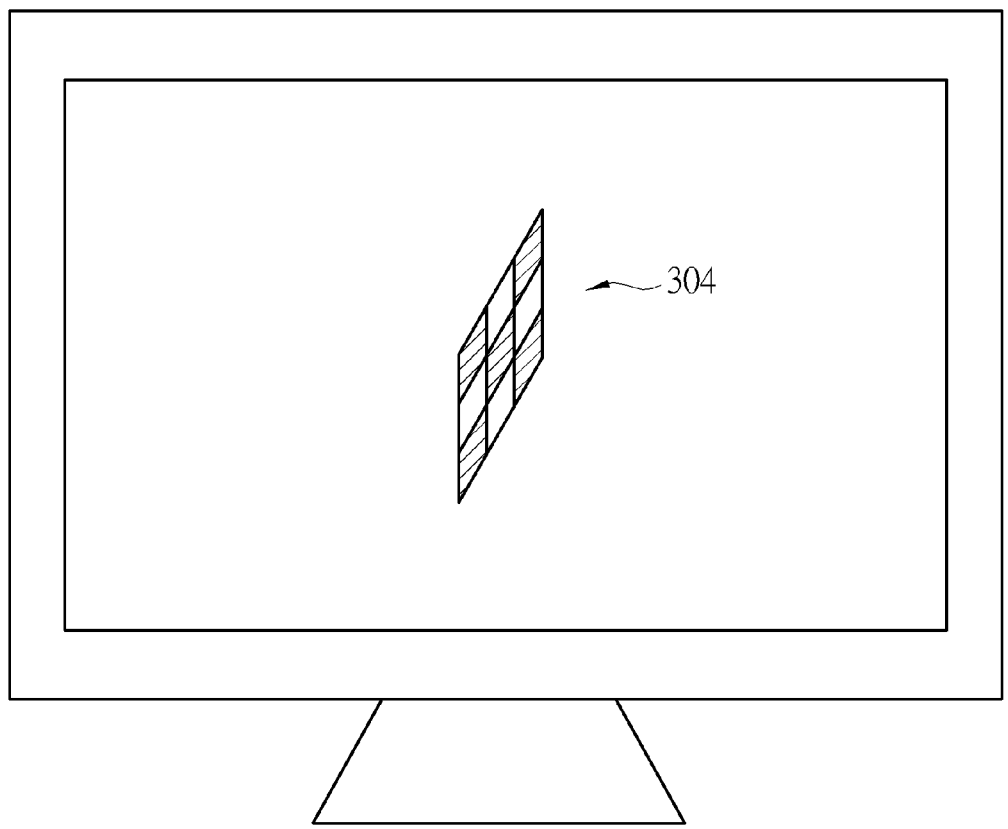

In Step 202. the plurality of camera calibration parameters of the stereo camera 100 include internal parameters and external parameters of the stereo camera 100, wherein the internal parameters of the stereo camera 100 include a lens focal length, an optical axis, a size of each of a plurality of sensors, a number of pixels, a lens curvature, or a lens distortion corresponding to the left eye image capture unit 102, and a lens focal length, an optical axis, a size of each of a plurality of sensors, a number of pixels, a lens curvature, or a lens distortion corresponding to the right eye pattern capture unit 104. The external parameters of the stereo camera 100 include a position of the left eye image capture unit 102, a position of the right eye pattern capture unit 104, a distance between the left eye image capture unit 102 and the right eye pattern capture unit 104, a relative rotation angle between the left eye image capture unit 102 and the right eye pattern capture unit 104, a relative skew between the left eye image capture unit 102 and the right eye pattern capture unit 104, and color and luminance errors between the left eye image capture unit 102 and the right eye pattern capture unit 104. But, the present invention is not limited to the above mentioned the plurality of camera calibration parameters of the stereo camera 100. In addition, whether to execute Step 202 can depend on a real requirement. In Step 204, the host 1202 can generate the plurality of left eye patterns corresponding to the two-dimensional pattern of the at least one two-dimensional pattern, wherein each left eye pattern of the plurality of left eye patterns corresponds to a predetermined angle and a predetermined distance (shown in FIGS. 3-5), wherein a left eye pattern 300 shown in FIG. 3 simulates a first real left eye pattern corresponding to an angle 15o and a distance (1 m) between the stereo camera 100 and the first real left eye pattern, a left eye pattern 302 shown in FIG. 4 simulates a second real left eye pattern corresponding to an angle 30o and a distance (2 m) between the stereo camera 100 and the second real left eye pattern, and a left eye pattern 304 shown in FIG. 5 simulates a third real left eye pattern corresponding to an angle 60 and a distance (3 m) between the stereo camera 100 and the third real left eye pattern. In addition, the angles (15o, 30o, 60o) and the distances (1 m, 2 m, 3 m) shown in FIGS. 3-5 can be dynamically generated by the host 1202 or pre-stored in the storage device 2022 of the host 1202, wherein the storage device 2022 can be a memory or a compact disc. In addition, the host 1202 can control errors between the left eye pattern 300, the left eye pattern 302, and the left eye pattern 304 shown in FIGS. 3-5 and the first real left eye pattern, the second real left eye pattern, and the third real left eye pattern, respectively. In addition, in another embodiment of the present invention, the host 1202 can generate one left eye pattern corresponding to a two-dimensional pattern of the at least one two-dimensional pattern, wherein the left eye pattern corresponds to a predetermined angle and a predetermined distance, that is, the host 1202 only generates one left eye pattern corresponding to a two-dimensional pattern of the at least one two-dimensional pattern. In Step 206, when the display 1204 displays the each left eye pattern of the plurality of left eye patterns corresponding to the two-dimensional pattern of the at least one two-dimensional pattern, the left eye image capture unit 102 can capture the first image corresponding to the each left eye pattern of the plurality of left eye patterns, and store the first image corresponding to the each left eye pattern of the plurality of left eye patterns to the storage device 2022. In Step 208-210, because operational principles of the stereo camera 100 and the calibration system 120 executed on the plurality of right eye patterns corresponding to the two-dimensional pattern of the at least one two-dimensional pattern are the same as those of the stereo camera 100 and the calibration system 120 executed on the plurality of left eye patterns corresponding to the two-dimensional pattern of the at least one two-dimensional pattern (shown in Steps 204-206), so further description thereof is omitted for simplicity. In addition, the each left eye pattern of the plurality of left eye patterns corresponding to the two-dimensional pattern of the at least one two-dimensional pattern corresponds to a right eye pattern of the plurality of right eye patterns corresponding to the two-dimensional pattern of the at least one two-dimensional pattern each other. In addition, the present invention is not limited to an executing sequence of Steps 204, 206, 208, 210, that is, in another embodiment of the present invention, Steps 204, 206 are executed following behind Steps 208, 210. In Step 214, the host 1202 can utilize Open Source Computer Vision Library (OpenCV) to generate the plurality of new camera calibration parameters according to a plurality of corresponding feature points between each first image of the plurality of first images stored in the storage device 2022 corresponding to the all left eye patterns of the at least one two-dimensional pattern and a corresponding second image of the plurality of second images stored in the storage device 2022 corresponding to the all right eye patterns of the at least one two-dimensional pattern. But, the present invention is not limited to the host 1202 utilizing the OpenCV to generate the plurality of new camera calibration parameters in Step 214, that is, the present invention can also utilize other methods provided by the prior art to generate the plurality of new camera calibration parameters. In Step 216, after the host 1202 generates the plurality of new camera calibration parameters, the host 1202 can generate the plurality of new image rectification parameters of the stereo camera 100 according to the plurality of new camera calibration parameters. If a stereo image generated by the stereo camera 100 according to the plurality of new camera calibration parameters and the plurality of new image rectification parameters can not satisfy a requirement of a manufacturer of the stereo camera 100, the manufacturer of the stereo camera 100 can repeatedly execute the above mentioned steps (Steps 204-214) until the stereo image generated by the stereo camera 100 can satisfy the requirement of the manufacturer of the stereo camera 100.

To sum up, the calibration system of the stereo camera and the calibration method of the stereo camera can utilize the host to quickly simulate to generate at least one left eye pattern and at least one right eye pattern corresponding to each two-dimensional pattern of at least one two-dimensional pattern to the display, wherein each left eye pattern of the at least one left eye pattern and a corresponding right eye pattern of the at least one right eye pattern correspond to a predetermined angle and a predetermined distance. Therefore, compared to the prior art, the present invention has advantages as follows: first, because the host can simulate to generate the at least one left eye pattern and the at least one right eye pattern corresponding to the each two-dimensional pattern of the at least one two-dimensional pattern to the display, the present invention does not need a robotic arm to control the at least one two-dimensional pattern to different predetermined angles and different predetermined distances to simplify a verification environment before the stereo camera is shipped; and second, because the host can quickly simulate to generate the at least one left eye pattern and the at least one right eye pattern corresponding to the each two-dimensional pattern of the at least one two-dimensional pattern to the display, the present invention can significantly reduce verification time before the stereo camera is shipped.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method of a stereo camera, wherein a calibration system applied to the calibration method comprises a host and a display, and the stereo camera comprises a left eye image capture unit and a right eye pattern capture unit, the calibration method comprising:

the host optionally setting a plurality of camera calibration parameters and a plurality of image rectification parameters of the stereo camera;

the left eye image capture unit and the right eye pattern capture unit executing an image capture step on at least one left eye pattern and at least one right eye pattern generated by the host corresponding to each two-dimensional pattern of at least one two-dimensional pattern, respectively, wherein the image capture step comprises:

the display displaying the at least one left eye pattern, wherein each left eye pattern of the at least one left eye pattern corresponds to a predetermined angle and a predetermined distance;

the left eye image capture unit capturing a first image corresponding to the each left eye pattern;

the display displaying the at least one right eye pattern, wherein each right eye pattern of the at least one right eye pattern corresponds to the predetermined angle and the predetermined distance; and the right eye pattern capture unit capturing a second image corresponding to the each right eye pattern;

the host generating a plurality of new camera calibration parameters according to a plurality of first images corresponding to all left eye patterns of the at least one two-dimensional pattern and a plurality of second images corresponding to all right eye patterns of the at least one two-dimensional pattern after the image capture step is executed on the at least one left eye pattern and the at least one right eye pattern corresponding to the each two-dimensional pattern; and the host generating a plurality of new image rectification parameters according to the plurality of new camera calibration parameters.

2. The calibration method of claim 1, wherein the plurality of camera calibration parameters of the stereo camera comprise internal parameters and external parameters of the stereo camera.

3. The calibration method of claim 2, wherein the internal parameters of the stereo camera comprise a lens focal length, an optical axis, a size of each of a plurality of sensors, a number of pixels, a lens curvature, or a lens distortion corresponding to the left eye image capture unit, and a lens focal length, an optical axis, a size of each of a plurality of sensors, a number of pixels, a lens curvature, or a lens distortion corresponding to the right eye pattern capture unit; and the external parameters of the stereo camera comprise a position of the left eye image capture unit, a position of the right eye pattern capture unit, a distance between the left eye image capture unit and the right eye pattern capture unit, a relative rotation angle between the left eye image capture unit and the right eye pattern capture unit, a relative skew between the left eye image capture unit and the right eye pattern capture unit, and color and luminance errors between the left eye image capture unit and the right eye pattern capture unit.

4. The calibration method of claim 1, wherein the image capture step further comprises:

the left eye image capture unit storing the first image to a storage device of the host; and the right eye pattern capture unit storing the second image to the storage device.

5. The calibration method of claim 1, wherein the each left eye pattern corresponding to the predetermined angle and the predetermined distance simulates a real left eye pattern corresponding to the predetermined angle and the predetermined distance, and the each right eye pattern corresponding to the predetermined angle and the predetermined distance simulates a real right eye pattern corresponding to the predetermined angle and the predetermined distance.

6. The calibration method of claim 5, wherein the host further controls an error between the each left eye pattern and the real left eye pattern, and an error between the each right eye pattern and the real right eye pattern.

7. The calibration method of claim 1, wherein the predetermined angle and the predetermined distance are dynamically generated by the host, or pre-stored in a storage device of the host.

8. The calibration method of claim 1, wherein the each left eye pattern corresponds to the each right eye pattern.

9. The calibration method of claim 1, wherein the host generates the plurality of new camera calibration parameters according to a plurality of corresponding feature points between each first image of the plurality of first images corresponding to the all left eye patterns of the at least one two-dimensional pattern and a corresponding second image of the plurality of second images corresponding to the all right eye patterns of the at least one two-dimensional pattern after the image capture step is executed on the at least one left eye pattern and the at least one right eye pattern corresponding to the each two-dimensional pattern.

10. A calibration system of a stereo camera, wherein the stereo camera comprises a left eye image capture unit and a right eye pattern capture unit, the calibration system comprising:

a host optionally setting a plurality of camera calibration parameters and a plurality of image rectification parameters of the stereo camera, and generating at least one left eye pattern and at least one right eye pattern corresponding to each two-dimensional pattern of at least one two-dimensional pattern; and a display coupled to the host for displaying the at least one left eye pattern and the at least one right eye pattern, wherein each left eye pattern of the at least one left eye pattern and each right eye pattern of the at least one right eye pattern correspond to a predetermined angle and a predetermined distance;

wherein after the display displays the each left eye pattern, the left eye image capture unit captures a first image corresponding to the each left eye pattern, and after the display displays the each right eye pattern, the right eye pattern capture unit captures a second image corresponding to the each right eye pattern; wherein after the left eye image capture unit captures the first image corresponding to the each left eye pattern, and the right eye pattern capture unit captures the second image corresponding to the each right eye pattern, the host further generates a plurality of new camera calibration parameters according to a plurality of first images corresponding to all left eye patterns of the at least one two-dimensional pattern and a plurality of second images corresponding to all right eye patterns of the at least one two-dimensional pattern, and generates a plurality of new image rectification parameters according to the plurality of new camera calibration parameters.

11. The calibration system of claim 10, wherein the first image is stored to a storage device of the host, and the second image is stored to the storage device.

12. The calibration system of claim 10, wherein the each left eye pattern corresponding to the predetermined angle and the predetermined distance simulates a real left eye pattern corresponding to the predetermined angle and the predetermined distance, and the each right eye pattern corresponding to the predetermined angle and the predetermined distance simulates a real right eye pattern corresponding to the predetermined angle and the predetermined distance.

13. The calibration system of claim 12, wherein the host further controls an error between the each left eye pattern and the real left eye pattern, and an error between the each right eye pattern and the real right eye pattern.

14. The calibration system of claim 10, wherein the predetermined angle and the predetermined distance are dynamically generated by the host, or pre-stored in a storage device of the host.

15. The calibration system of claim 10, wherein the each left eye pattern corresponds to the each right eye pattern.

16. The calibration system of claim 10, wherein the host generates the plurality of new camera calibration parameters according to a plurality of corresponding feature points between each first image of the plurality of first images corresponding to the all left eye patterns of the at least one two-dimensional pattern and a corresponding second image of the plurality of second images corresponding to the all right eye patterns of the at least one two-dimensional pattern.

17. A calibration system of a stereo camera, wherein the stereo camera comprises a left eye image capture unit and a right eye pattern capture unit, the calibration system comprising:
- a host optionally setting a plurality of camera calibration parameters and a plurality of image rectification parameters of the stereo camera, and generating at least one left eye pattern and at least one right eye pattern corresponding to each two-dimensional pattern of at least one two-dimensional pattern; and
- a display coupled to the host for displaying the at least one left eye pattern and the at least one right eye pattern, and each left eye pattern of the at least one left eye pattern and each right eye pattern of the at least one right eye pattern corresponding to a predetermined angle and a predetermined distance, wherein the left eye image capture unit of the stereo camera generates a plurality of first images according to the at least one left eye pattern, and the right eye pattern capture unit of the stereo camera generates a plurality of second images according to the at least one right eye pattern;
- wherein the host generates a plurality of new camera calibration parameters according to the plurality of first images and the plurality of second images, and generates a plurality of new image rectification parameters according to the plurality of new camera calibration parameters.

* * * * *